US009456072B2

(12) United States Patent
Kwon et al.

(10) Patent No.: US 9,456,072 B2
(45) Date of Patent: Sep. 27, 2016

(54) APPARATUS AND METHOD FOR MANAGING APPLICATION IN WIRELESS TERMINAL

(71) Applicant: Samsung Electronics Co., Ltd., Gyeonggi-do (KR)

(72) Inventors: Se-Hong Kwon, Busan (KR); Don-Gyo Jun, Gyeongsangbuk-do (KR); Soon-Shik Hwang, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/847,368

(22) Filed: Sep. 8, 2015

(65) Prior Publication Data

US 2015/0381792 A1   Dec. 31, 2015

Related U.S. Application Data

(63) Continuation of application No. 14/707,866, filed on May 8, 2015, now Pat. No. 9,161,224, which is a continuation of application No. 14/498,109, filed on Sep. 26, 2014, now Pat. No. 9,077,810, which is a continuation of application No. 13/404,806, filed on Feb. 24, 2012, now Pat. No. 8,886,165.

(30) Foreign Application Priority Data

Aug. 30, 2011   (KR) .......................... 10-2011-0087304

(51) Int. Cl.
*H04M 1/725* (2006.01)
*H04W 12/08* (2009.01)
*G06F 21/36* (2013.01)

(Continued)

(52) U.S. Cl.
CPC ........ *H04M 1/72522* (2013.01); *G06F 3/0488* (2013.01); *G06F 21/36* (2013.01); *G06F 21/45* (2013.01); *G06F 21/46* (2013.01); *G06F 21/74* (2013.01); *H04W 12/06* (2013.01); *H04W 12/08* (2013.01); *G06F 2221/2105* (2013.01);

(Continued)

(58) Field of Classification Search
CPC ........ G06F 21/36; G06F 21/45; G06F 21/46; G06F 21/74; G06F 2221/2105; G06F 2221/2113; G06F 2221/2117; G06F 2221/2147; G06F 3/0488; H04M 1/72522; H04W 12/06; H04W 12/08
See application file for complete search history.

(56) References Cited

U.S. PATENT DOCUMENTS 7,593,000 B1   9/2009   Chin
8,588,739 B2   11/2013   Kawabata (Continued)

FOREIGN PATENT DOCUMENTS

CN   101980131 A   2/2011
CN   102970408 A   3/2013

(Continued)

*Primary Examiner* — Kashif Siddiqui
(74) *Attorney, Agent, or Firm* — Cha & Reiter, LLC.

(57) ABSTRACT

Provided is an apparatus and method for managing an application in a wireless terminal, in which data of an application is managed and displayed according to an input type of a password for unlocking the wireless terminal, wherein the apparatus includes a memory for storing a plurality of passwords and a controller for classifying and managing data of each of a plurality of applications according to a password type.

17 Claims, 4 Drawing Sheets

(51) Int. Cl.
*G06F 3/0488* (2013.01)
*G06F 21/45* (2013.01)
*G06F 21/46* (2013.01)
*G06F 21/74* (2013.01)
*H04W 12/06* (2009.01)

(52) U.S. Cl.
CPC .............. *G06F2221/2113* (2013.01); *G06F 2221/2117* (2013.01); *G06F 2221/2147* (2013.01)

(56) References Cited

U.S. PATENT DOCUMENTS

| | | | |
|---|---|---|---|
| 8,812,994 | B2 | 8/2014 | Seymour et al. |
| 2003/0163811 | A1 | 8/2003 | Luehrs |
| 2004/0236508 | A1 | 11/2004 | Ogasawara |
| 2005/0097563 | A1 | 5/2005 | Bidet et al. |
| 2007/0011461 | A1 | 1/2007 | Jeng |
| 2007/0150842 | A1* | 6/2007 | Chaudhri ............ G06F 3/04883 715/863 |
| 2008/0263643 | A1 | 10/2008 | Jaiswal et al. |
| 2009/0284482 | A1 | 11/2009 | Chin |
| 2010/0138914 | A1* | 6/2010 | Davis ............... G06F 21/32 726/19 |
| 2010/0199100 | A1 | 8/2010 | Goertzen |
| 2010/0306718 | A1 | 12/2010 | Shim et al. |
| 2011/0080349 | A1 | 4/2011 | Holbein et al. |
| 2011/0080350 | A1 | 4/2011 | Almalki et al. |
| 2011/0088086 | A1* | 4/2011 | Swink ............. G06F 3/04883 726/7 |
| 2011/0256848 | A1* | 10/2011 | Bok ............... G06F 3/04883 455/411 |
| 2011/0294467 | A1* | 12/2011 | Kim ................ G06F 1/1643 455/411 |
| 2011/0316797 | A1* | 12/2011 | Johansson .......... G06F 3/04883 345/173 |
| 2012/0023573 | A1 | 1/2012 | Shi |
| 2012/0046077 | A1* | 2/2012 | Kim ................. H04M 1/72577 455/566 |
| 2012/0054057 | A1 | 3/2012 | O'Connell et al. |
| 2012/0066650 | A1 | 3/2012 | Tirpak et al. |
| 2012/0081282 | A1* | 4/2012 | Chin ................. G06F 3/011 345/156 |
| 2012/0084734 | A1 | 4/2012 | Wilairat |
| 2012/0151400 | A1 | 6/2012 | Hong et al. |
| 2012/0291121 | A1 | 11/2012 | Huang et al. |
| 2012/0311499 | A1* | 12/2012 | Dellinger ........... H04N 5/23206 715/835 |
| 2013/0014250 | A1 | 1/2013 | Brown et al. |
| 2013/0052993 | A1 | 2/2013 | Kwon et al. |
| 2013/0093707 | A1 | 4/2013 | Park et al. |
| 2013/0318598 | A1 | 11/2013 | Meacham |
| 2013/0333020 | A1 | 12/2013 | Deshpande |
| 2014/0040943 | A1 | 2/2014 | Knowles et al. |
| 2014/0075552 | A1 | 3/2014 | Guriappa Srinivas et al. |
| 2014/0143844 | A1 | 5/2014 | Goertzen |
| 2014/0259152 | A1 | 9/2014 | Yun |
| 2015/0245210 | A1 | 8/2015 | Kwon et al. |

FOREIGN PATENT DOCUMENTS

| | | |
|---|---|---|
| EP | 1 816 580 A1 | 8/2007 |
| EP | 2 565 809 A2 | 3/2013 |
| KR | 10-0496954 B1 | 6/2005 |
| KR | 10-2007-0002346 A | 1/2007 |
| KR | 10-2009-0073864 A | 7/2009 |
| KR | 10-2010-0134884 A | 12/2010 |
| KR | 10-2011-0042634 A | 4/2011 |
| KR | 10-2012-0006696 A | 1/2012 |
| KR | 10-2014-0070307 A | 6/2014 |
| WO | 2004/046925 A1 | 6/2004 |
| WO | 2010/040670 A2 | 4/2010 |
| WO | 2012/012280 A2 | 1/2012 |

* cited by examiner

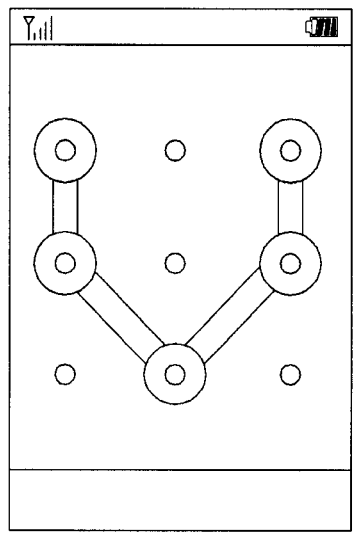 
FIG.4A　　　　FIG.4B
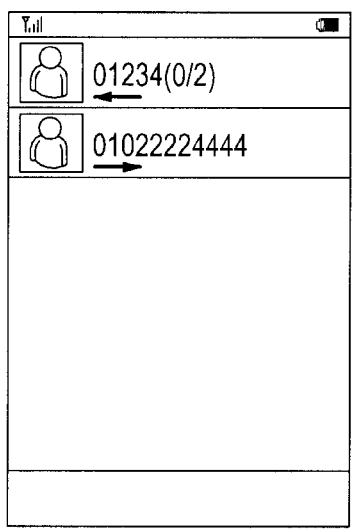 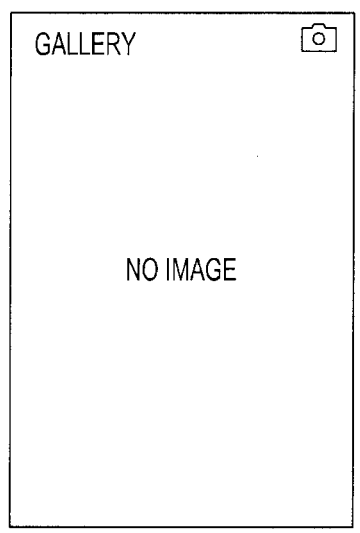
FIG.4C　　　　FIG.4D

APPARATUS AND METHOD FOR MANAGING APPLICATION IN WIRELESS TERMINAL

CROSS REFERENCE TO RELATED APPLICATIONS

The present application is a Continuation of U.S. patent application Ser. No. 14/707,866 filed on May 8, 2015 which claims the benefit of the earlier U.S. patent application Ser. No. 14/498,109 filed on Sep. 26, 2014 and assigned U.S. Pat. No. 9,077,810 issued on Jul. 7, 2015 which claims the benefit of the earlier U.S. patent application Ser. No. 13/404,806 filed on Feb. 24, 2012 and assigned U.S. Pat. No. 8,886,165 issued on Nov. 11, 2014 which claims the benefit of the earlier filing date, under 35 U.S.C. §119 of a Korean Patent Application filed in the Korean Intellectual Property Office on Aug. 30, 2011 and assigned Ser. No. 10-2011-0087304, the entire disclosure of which is hereby incorporated by reference.

BACKGROUND

1. Field of the Invention

The present invention relates to an apparatus and method for managing an application in a wireless terminal.

2. Description of the Related Art

To protect private information, a password is generally used in a wireless terminal. The password used in the wireless terminal, however, merely unlocks the wireless terminal.

Moreover, the wireless terminal can store only one password and does not provide a function of distinguishing a user or managing data using the password.

SUMMARY

Accordingly, an aspect of the present invention is to provide an apparatus and method for managing an application of a wireless terminal, in which data of an application is managed according to a type of a password for unlocking the wireless terminal.

According to an aspect of the present invention, an apparatus for managing an application in a wireless terminal includes a memory for storing a plurality of passwords, and a controller for classifying and managing data of each of a plurality of applications according to a type of a password.

According to another aspect of the present invention, a method for managing an application in a wireless terminal includes inputting a particular password for unlocking the wireless terminal, and if the input particular password is included in a plurality of preset passwords, classifying and managing each of a plurality of applications according to a type of the input particular password.

BRIEF DESCRIPTION OF THE DRAWINGS

The above and other features and advantages of an exemplary embodiment of the present invention will be more apparent from the following detailed description taken in conjunction with the accompanying drawings, in which:

FIG. 3A, FIG. 3B, FIG. 3C, FIG. 3D, FIG. 4A, FIG. 4B, FIG. 4C and FIG. 4D are diagrams for describing an operation of managing an application in a wireless terminal according to an embodiment of the present invention.

DETAILED DESCRIPTION

Figure 1:
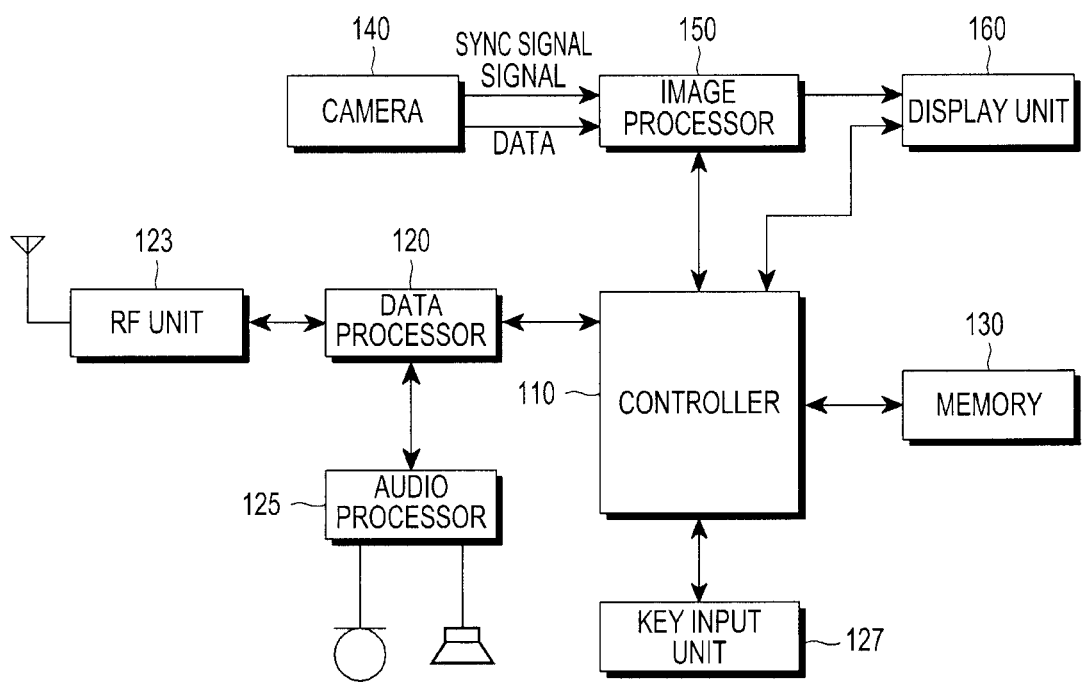
FIG. 1 is a block diagram of a wireless terminal according to an embodiment of the present invention.

Hereinafter, an exemplary embodiment of the present invention will be described in detail with reference to the accompanying drawings. It should be noted that identical reference numerals refer to identical components throughout the drawings.

FIG. 1 is a block diagram of a wireless terminal according to an embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. The data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions.

A memory 130 includes program and data memories. The program memory stores programs for controlling a general operation of the wireless terminal and a program for individually managing data of a plurality of applications according to a type of a password for unlocking the wireless terminal according to an embodiment of the present invention. The data memory also temporarily stores data generated during execution of the programs.

According to an embodiment of the present invention, the memory 130 stores a plurality of passwords which are preset by a user, such that data corresponding each of a plurality of applications stored in the wireless terminal can be classified and managed using these passwords. That is, the passwords are used to unlock the wireless terminal, such as unlocking patterns or unlocking numbers. The plurality of passwords includes at least one password for classifying and managing data corresponding to each of the plurality of applications, and/or at least one password for collectively managing data of each of the plurality of applications. That is, the invention provides classifying and managing data of each of the plurality of applications by a particular password, or collectively managing (i.e., not dividing) data of each of the plurality of applications by a particular password. Here, the plurality of applications includes all applications executed in the wireless terminal, such as a phone directory application, a message application, an album application, recent records, etc., and the data may include prestored data or currently generated data for a subsequent retrieval, as explained later with reference to FIGS. 3 and 4.

The controller 110 controls the overall operation of the wireless terminal.

According to an embodiment of the present invention, the controller 110 classifies and manages data of each of the plurality of applications stored in the wireless terminal according to a type of a password.

According to an embodiment of the present invention, when a password input during a locking state of the wireless terminal is included in the plurality of preset passwords, the controller 110 classifies and manages data of each of the plurality of applications according to a type of the input password. The preset passwords may include predetermined patterns and/or predetermined numbers for unlocking the wireless terminal.

According to an embodiment of the present invention, when a particular password input during a locking state of the wireless terminal is included in the plurality of preset passwords, the controller 110 unlocks the password and switches the wireless terminal to a mode corresponding to the input particular password (or particular-password mode). When a data view menu for an application among the plurality of applications is selected in the particular-password mode, the controller 110 displays only a certain data, stored in the particular-password mode. To this end, the controller 110 classifies data in which key values of the particular-password mode are stored, out of all data of the applications, as the data stored in the particular-password mode and displays the corresponding classified data. That is, when a particular-password is input, any data including the key values of the particular-password is retrieved for display.

Further, when data executed in the selected application is generating during the particular-password mode, the controller 110 classifies the executed data as data of the particular-password mode and stores the executed or generated data as the data of the particular-password mode by assigning key values corresponding to the particular-password mode to the newly executed or generated data. That is, the controller 110 stores the key values of the particular-password mode in the data executed in the selected application, thereby classifying the data for a subsequent retrieval as the data of the particular-password mode.

A camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

According to an embodiment of the present invention, when the wireless terminal is unlocked by a particular one of the plurality of passwords, the display unit 160 displays only data stored in a particular-password mode, out of data of a corresponding application.

Hereinafter, a detailed description will be made of an operation of managing an application according to a type of a password in the wireless terminal with reference to FIGS. 2 through 4D.

Figure 2:
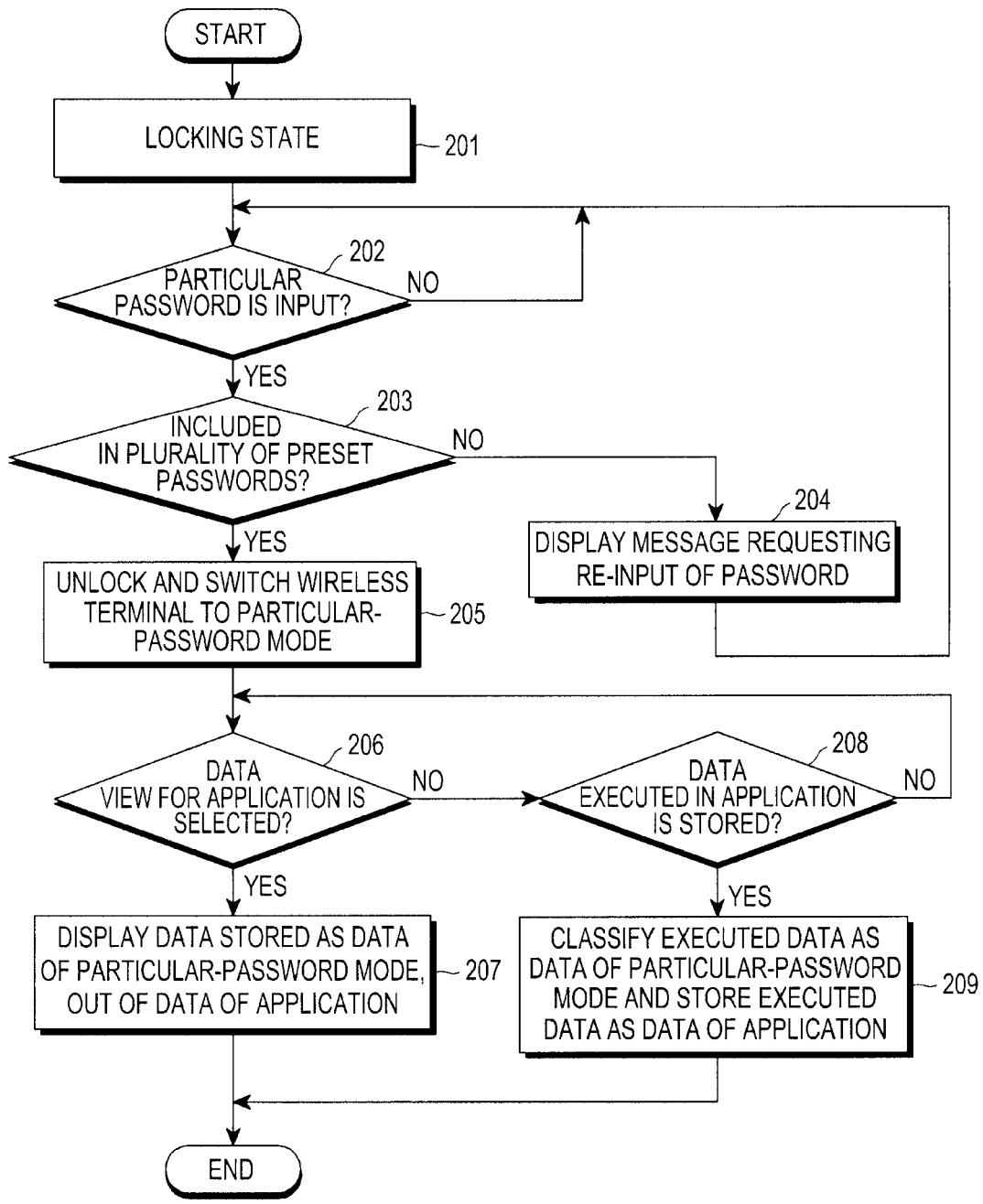
FIG. 2 is a flowchart illustrating a process of managing an application in a wireless terminal according to an embodiment of the present invention.

FIG. 2 is a flowchart illustrating a process of managing an application in a wireless terminal according to an embodiment of the present invention, and FIGS. 3A through 4D are diagrams for describing an operation of managing an application in a wireless terminal according to an embodiment of the present invention.

Herein, the teachings of the present invention will be described in detail with reference to FIGS. 2 through 4D, together with FIG. 1.

Referring to FIG. 2, upon input of a particular password for unlocking the wireless terminal in step 201 from a locking state, the controller 110 senses the input in step 202 and determines whether the input particular password is included in a plurality of preset passwords in step 203.

If determining that the input particular password is not included in the plurality of preset passwords in step 203, the controller 110 displays a message requesting re-input of a password in step 204.

If determining that the input particular password is included in the plurality of preset passwords in step 203, the controller 110 unlocks the wireless terminal and switches the wireless terminal to a particular-password mode corresponding to the input particular password in step 205.

In the particular password mode, if a data view menu for a corresponding application is selected in step 206, the controller 110 extracts data which stores key values of the particular-password mode from data of the corresponding application and displays only the extracted data as the data of the corresponding application on the display unit 160 in step 207.

In the particular-password mode, if a data view is not selected in step 206 and if data executed in a corresponding application is stored in step 208, the controller 110 stores key values of the particular-password mode in the executed data to classify the executed data as the data of the particular-password mode and store the executed data as the data of the corresponding application in step 209.

The process illustrated in FIG. 2 will now be described in more detail with reference to FIGS. 3A through 4D in which a pattern is assumed to be used as a password for unlocking the wireless terminal.

Figure 3A:
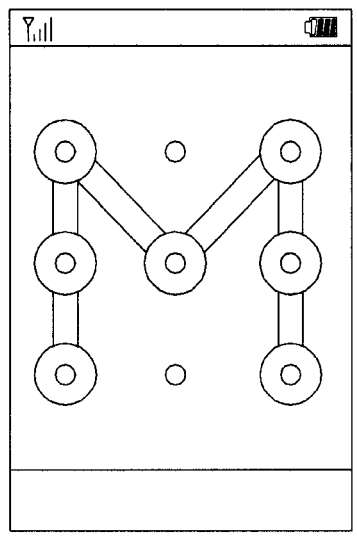
Figure 3B:
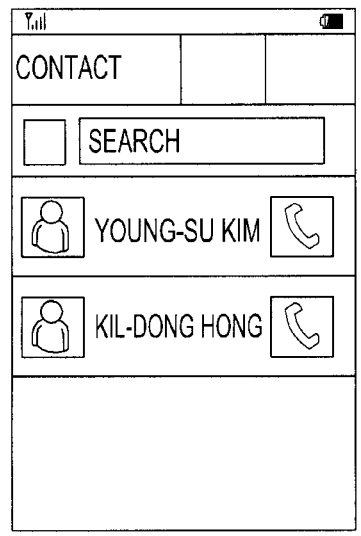

Referring to FIG. 3A, upon input of an "M" shaped pattern, out of a plurality of preset unlocking patterns, the wireless terminal is unlocked and switched to an "M" shaped pattern mode. If an application, such as a phone directory for example, is selected during the "M" shaped pattern mode, only phone number data storing key values of the "M" shaped pattern, out of all phone number data stored in the phone directory, is displayed as illustrated in FIG. 3B. Note that the key values corresponding to the "M" shaped pattern is prestored. When new phone number data is stored in the phone directory during the "M" shaped pattern mode, the key values indicating the "M" shaped pattern mode are newly stored, such that the stored new phone number data is classified as data representing the "M" shaped pattern mode for a later retrieval.

Note that the key values corresponding to data are prestored in each of the plurality of passwords. Accordingly, as shown in step 207, the data stored as the corresponding key value is extracted and displayed, when the application data corresponding to the particular-password mode is selected. As shown in step 209, the key values assigned in the particular-password mode are stored, when the data executed in the particular-password mode is stored. And, as shown in step 207, the data stored as the corresponding key value is extracted and displayed, when the application data corresponding to the particular-password mode is selected.

Figure 3C:
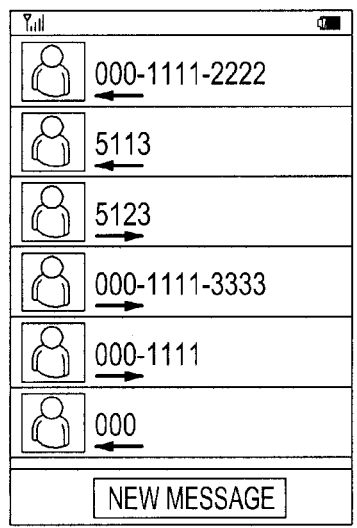

If a message application is selected during the "M" shaped pattern mode, only message data storing the key values of the "M" shaped pattern mode, out of outgoing/incoming messages stored in the message application, is displayed as illustrated in FIG. 3C. Note that the key values corresponding to the "M" shaped pattern is prestored. Also, if reception or transmission of new message data is performed in the "M" shaped pattern mode, the key values of the "M" shaped pattern mode are newly stored, such that the new message data is classified as data representing the "M" shaped pattern mode for a later retrieval.

Figure 3D:
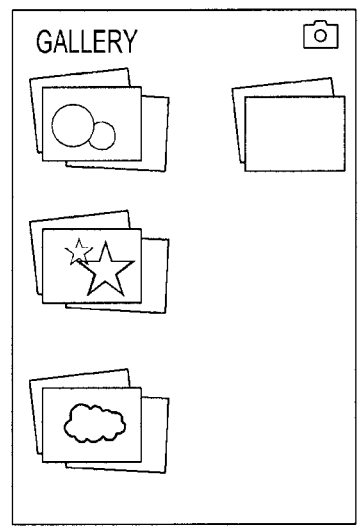

If an album view application is selected in the "M" shaped pattern mode, only image data storing the key values of the "M" shaped pattern mode, out of image data stored in the album view application, is displayed as illustrated in FIG. 3D. Note that the key values corresponding to the "M" shaped pattern is prestored. Further, if storing of a new image due to reception or capturing of the new image is selected in the "M" shaped pattern mode, the key values of the "M" shaped pattern mode are newly stored, such that the new image data is classified as data representing the "M" shaped pattern mode.

Referring to FIG. 4A, upon input of a "V" shaped pattern out of the plurality of preset unlocking patterns, the wireless terminal is unlocked and switched to a "V" shaped pattern mode. If an application, a phone directory for example, is selected during the "V" shaped pattern mode, only phone number data storing key values of the "V" shaped pattern, out of all the phone number data stored in the phone directory, is displayed as illustrated in FIG. 4B. Note that the key values corresponding to the "V" shaped pattern is prestored. Similarly, when new phone number data is stored in the phone directory in the "V" shaped pattern mode, the key values of the "V" shaped pattern mode are newly stored, such that the stored new phone number data is classified as data of the "V" shaped pattern mode for a later retrieval.

If a message application is selected in the "V" shaped pattern mode, only message data storing the key values of the "V" shaped pattern mode, out of outgoing/incoming messages stored in the message application, is displayed as illustrated in FIG. 4C. Note that the key values corresponding to the "V" shaped pattern is prestored. If reception or transmission of new message data is performed in the "V" shaped pattern mode, the key values of the "V" shaped pattern mode are newly stored i, such that the new message data is classified as data of the "V" shaped pattern mode.

Upon selection of an album view application in the "V" shaped pattern mode, if there is no image data storing the key values of the "V" shaped pattern mode, out of image data stored in the album view application, absence of image data is displayed as illustrated in FIG. 4D. If storing of a new image due to reception or capturing of the new image is selected in the "V" shaped pattern mode, the key values of the "V" shaped pattern mode are stored in the new image data, such that the new image data is classified as data of the "V" shaped pattern mode.

As can be appreciated from the foregoing description, by providing an apparatus and method for managing data according to a type of a password in a wireless terminal, even when the wireless terminal is unlocked by a password input by a third party, only data of an application corresponding to a type of the input password is displayed, thereby keeping private information protection.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While a detailed embodiment such as a wireless terminal has been described in the present invention, various changes may be made without departing from the scope of the present invention. Accordingly, the scope of the present invention should be defined by the claims and equivalents thereof, rather than the described embodiment.

What is claimed is:

1. A wireless terminal comprising:
   a touch screen configured to receive a plurality of touch inputs in a locking state of the wireless terminal; and
   a controller configured to:
   identify a position of each of the plurality of touch inputs and an order of the plurality of touch inputs inputted through the touch screen in the locking state of the wireless terminal;
   operate the wireless terminal in a first unlock mode after releasing the locking state of the wireless terminal, if the position and the order of the plurality of touch inputs through the touch screen correspond to the first unlock mode;
   operate the wireless terminal in a second unlock mode different from the first unlock mode after releasing the locking state of the wireless terminal, if the position and the order of the plurality of touch inputs through the touch screen correspond to the second unlock mode; and when a first application is selected after entering the first unlocking mode, execute the first application and control the touch screen to display first data associated with the first unlocking mode.

2. The wireless terminal of claim 1, wherein the position and the order of each of the plurality of touch inputs, which correspond to the first unlock mode, are different from the position and the order of each of the plurality of touch inputs, which correspond to the second unlock mode.

3. The wireless terminal of claim 1, wherein the plurality of touch inputs are received continuously on the touch screen.

4. A method performed in a wireless terminal having a touch screen, the method comprising:
  identifying a position of each of a plurality of touch inputs and an order of the plurality of touch inputs inputted through the touch screen in a locking state of the wireless terminal;
  operating the wireless terminal in a first unlock mode after releasing the locking state of the wireless terminal, if the position and the order of the plurality of touch inputs through the touch screen correspond to the first unlock mode;
  operating the wireless terminal in a second unlock mode different from the first unlock mode after releasing the locking state of the wireless terminal, if the position and the order of the plurality of touch inputs through the touch screen correspond to the second unlock mode; and
  when a first application is selected after entering the first unlocking mode, executing the first application and displaying via the touch screen first data associated with the first unlocking mode.

5. The method of claim 4, wherein the position and the order of each of the plurality of touch inputs, which correspond to the first unlock mode, are different from the position and the order of each of the plurality of touch inputs, which correspond to the second unlock mode.

6. The method of claim 4, wherein the plurality of touch inputs are received continuously on a touch screen that displays the screen.

7. The wireless terminal of claim 1, wherein the controller is further configured to:
  when the first application is selected after entering the second unlocking mode, execute the first application and control the touch screen to display second data in association with the second unlocking mode and the first data.

8. The wireless terminal of claim 7, wherein the controller is further configured to:
  during operation in the first unlocking mode, store the first data in association with the first unlocking mode; and
  during operation in the second unlocking mode, store the second data in association with the second unlocking mode.

9. The wireless terminal of claim 8, wherein the first application is a message application, an album view application or a phone directory application, and wherein the first data and second data are each message data, image data or phone number data.

10. The method of claim 4, further comprising:
  when the first application is selected after entering the second unlocking mode, executing the first application and controlling the touch screen to display second data in association with the second unlocking mode and the first data.

11. The method of claim 10, wherein the first application is a message application, an album view application or a phone directory application, and wherein the first data and second data are each message data, image data or phone number data.

12. A non-transitory computer-readable storage medium having stored therein program instructions, which when executed by a processor of a wireless terminal having a touch screen, execute a method comprising:
  identifying a position of each of a plurality of touch inputs and an order of the plurality of touch inputs inputted through the touch screen in a locking state of the wireless terminal;
  operating the wireless terminal in a first unlock mode after releasing the locking state of the wireless terminal, if the position and the order of the plurality of touch inputs through the touch screen correspond to the first unlock mode;
  operating the wireless terminal in a second unlock mode different from the first unlock mode after releasing the locking state of the wireless terminal, if the position and the order of the plurality of touch inputs through the touch screen correspond to the second unlock mode; and
  when a first application is selected after entering the first unlocking mode, executing the first application and displaying via the touch screen first data associated with the first unlocking mode.

13. The non-transitory computer-readable storage medium of claim 12, wherein the position and the order of each of the plurality of touch inputs, which correspond to the first unlock mode, are different from the position and the order of each of the plurality of touch inputs, which correspond to the second unlock mode.

14. The non-transitory computer-readable storage medium of claim 12, wherein the plurality of touch inputs are received continuously on a touch screen that displays the screen.

15. The non-transitory computer-readable storage medium of claim 12, further comprising:
  when the first application is selected after entering the second unlocking mode, executing the first application and controlling the touch screen to display second data in association with the second unlocking mode and the first data.

16. The non-transitory computer-readable storage medium of claim 15, further comprising:
  during operation in the first unlocking mode, storing the first data in association with the first unlocking mode; and
  during operation in the second unlocking mode, storing the second data in association with the second unlocking mode.

17. The non-transitory computer-readable storage medium of claim 16, wherein the first application is a message application, an album view application or a phone directory application, and wherein the first data and second data are each message data, image data or phone number data.

* * * * *

UNITED STATES PATENT AND TRADEMARK OFFICE
CERTIFICATE OF CORRECTION

PATENT NO. : 9,456,072 B2
APPLICATION NO. : 14/847368
DATED : September 27, 2016
INVENTOR(S) : Se-Hong Kwon et al.

It is certified that error appears in the above-identified patent and that said Letters Patent is hereby corrected as shown below:

In The Claims

Column 7, Claim 6, Line 41 should read as follows:
--...displays the unlock screen...--

Column 8, Claim 14, Lines 40-41 should read as follows:
--...displays the unlock screen...--

Signed and Sealed this
Twenty-ninth Day of November, 2016

Michelle K. Lee
*Director of the United States Patent and Trademark Office*